US011471984B2

(12) United States Patent
Duyvesteyn

(10) Patent No.: US 11,471,984 B2
(45) Date of Patent: Oct. 18, 2022

(54) CONTROL OF RECRYSTALLIZATION IN COLD-ROLLED ALMN(MG)SCZR SHEETS FOR BRAZING APPLICATIONS

(71) Applicant: Scandium International Mining Corp., Sparks, NV (US)

(72) Inventor: Willem P. C. Duyvesteyn, Reno, NV (US)

(73) Assignee: Scandium International Mining Corporation, Sparks, NV (US)

( * ) Notice: Subject to any disclaimer, the term of this patent is extended or adjusted under 35 U.S.C. 154(b) by 713 days.

(21) Appl. No.: 16/452,738

(22) Filed: Jun. 26, 2019

(65) Prior Publication Data
US 2020/0001407 A1 Jan. 2, 2020

Related U.S. Application Data

(60) Provisional application No. 62/823,647, filed on Mar. 25, 2019, provisional application No. 62/691,545, filed on Jun. 28, 2018.

(51) Int. Cl.
*C22F 1/04* (2006.01)
*C22C 21/00* (2006.01)
*B23K 35/28* (2006.01)
*B23K 1/00* (2006.01)
*F28F 1/20* (2006.01)
*F28F 21/08* (2006.01)
*C22C 1/02* (2006.01)
*B23K 103/10* (2006.01)

(52) U.S. Cl.
CPC ......... *B23K 35/286* (2013.01); *B23K 1/0012* (2013.01); *C22C 1/026* (2013.01); *C22C 21/00* (2013.01); *C22F 1/04* (2013.01); *F28F 1/20* (2013.01); *F28F 21/084* (2013.01); *B23K 2103/10* (2018.08)

(58) Field of Classification Search
CPC ......... C22C 1/026; C22C 21/00; C22F 1/04; B23K 2103/10
See application file for complete search history.

(56) References Cited

U.S. PATENT DOCUMENTS

| 3,104,252 | A | 9/1963 | Radd et al. |
| 3,395,001 | A | 7/1968 | Stroup et al. |
| 3,440,712 | A | 4/1969 | Stroup et al. |
| 3,619,181 | A | 11/1971 | Willey |
| 3,903,585 | A | 9/1975 | Kosteruk et al. |
| 4,143,802 | A | 3/1979 | Winterbottom |
| 4,689,090 | A | 8/1987 | Sawtell et al. |
| 4,838,341 | A | 6/1989 | Bye et al. |
| 4,874,440 | A | 10/1989 | Sawtell et al. |
| 4,929,511 | A | 5/1990 | Bye et al. |
| 5,037,608 | A | 8/1991 | Tarcy et al. |
| 5,055,257 | A | 10/1991 | Chakrabarti et al. |
| 5,238,646 | A | 8/1993 | Tarcy et al. |
| 5,597,529 | A | 1/1997 | Tack |
| 5,620,652 | A | 4/1997 | Tack et al. |
| 5,820,015 | A | 10/1998 | Childree |
| 6,387,527 | B1 | 5/2002 | Hasz et al. |
| 6,557,289 | B2 | 5/2003 | Stall et al. |
| 6,756,133 | B2 | 6/2004 | Palmer et al. |
| 7,407,714 | B2 * | 8/2008 | Haller ............... C22F 1/04 165/905 |
| 7,608,345 | B2 | 10/2009 | Bürger et al. |
| 2005/0014010 | A1 | 1/2005 | Dumm et al. |
| 2006/0269437 | A1 | 11/2006 | Pandey |
| 2007/0017604 | A1 | 1/2007 | Yan et al. |
| 2010/0068090 | A1 | 3/2010 | Langan |
| 2017/0121794 | A1 | 5/2017 | Lenczowski |
| 2018/0030577 | A1 | 2/2018 | Duyvesteyn |

FOREIGN PATENT DOCUMENTS

| AT | 413035 B | 3/2005 |
| CN | 101230431 B | 8/2011 |
| CN | 103170758 A | 6/2013 |
| CN | 103981408 B | 8/2014 |
| CN | 103112211 B | 4/2015 |
| CN | 103331531 A | 3/2017 |
| CN | 109702375 A | 5/2019 |
| EP | 0145933 A1 | 10/1989 |
| EP | 0760727 A1 | 3/1997 |

(Continued)

OTHER PUBLICATIONS

Jostein Röyset, "Scandium in Aluminium Alloys Overview: Physical Metallurgy, Properties and Applications", Metallurgical Science and Technology, pp. 11-21 (Jan. 1, 2017).
Ellen Vaders, "Aluminium and scandium a winning combination?", Aluminum Metal Knowledge (Dec. 19, 2016).
Karnesky et al., "Mechanical Properties of a Heat-Treatable Al—Sc Alloy Reinforced with Al2O3 Dispersoids", Affordable Metal Matrix Composites for High Performance Applications II, MS&T, pp. 215-224 (2003).
Blake, et al., "Constitution and Age Hardening of Al—Sc Alloys," Journal of Materials Science, 20 (1985), pp. 2861-2867.
Ahmad, Zaki (2003). The properties and application of scandium-reinforced aluminum JOM. 55. 35-39. 10.1007/s11837-003-0224-6.
J.A. Lee, P.S. Chen, "Aluminum-Scandium Alloys: Material Characterization, Friction Stir Welding, and Compatibility With Hydrogen Peroxide", MSFC Center Director's Discretionary Fund Final Report, Project No. 04-13, NASA/TM-2004-213604 (Dec. 2004).

(Continued)

*Primary Examiner* — Jessee R Roe
(74) *Attorney, Agent, or Firm* — John A. Fortkort; Fortkort & Houston PC

(57) ABSTRACT

A method for fabricating an article from an aluminum alloy is provided. The method includes providing an aluminum alloy containing at least 0.04 wt % Sc, at least 0.5 wt % Mn, at least 0.5 wt % Zr, at least 0.05 wt % Mg, and at least 90 wt % Al; casting the alloy into a sheet; subjecting the cast alloy to a thermal cycle which includes raising the temperature of the alloy along a first temperature gradient, holding the temperature of the alloy at a temperature T for a period of time t, and reducing the temperature of the alloy along a second temperature gradient; and utilizing the sheet in a brazing operation.

20 Claims, 18 Drawing Sheets
(18 of 18 Drawing Sheet(s) Filed in Color)

(56) References Cited

FOREIGN PATENT DOCUMENTS

| | | |
|---|---|---|
| EP | 0918095 A | 5/1999 |
| EP | 1439239 A1 | 7/2010 |
| EP | 2481518 A2 | 8/2012 |
| EP | 1645647 A1 | 7/2013 |
| FR | 2637914 A1 | 12/1992 |
| JP | 2008308761 A | 12/2008 |
| JP | 2008308760 A | 4/2013 |
| RU | 2384637 C1 | 1/2010 |
| RU | 2416657 C1 | 4/2011 |
| WO | 1995032074 A2 | 11/1995 |
| WO | 2005045080 A1 | 5/2005 |
| WO | 2017065460 A1 | 4/2017 |

OTHER PUBLICATIONS

Cory R. Williams, "The Effects of Scandium and Zirconium Additions on Aluminum Mechanical Properties, Post-Braze Grain Structure, and Extrusion", A thesis presented to the faculty of the Russ College of Engineering and Technology of Ohio University in partial fulfillment of the requirements for the degree Master of Science (Mar. 2012).

G.J. Marshall, R.K. Bolingbroke, A. Gray, "Microstructural Control in an Aluminum Core Alloy for Brazing Sheet Applications", Metallurgical Transactions A, vol. 24A, 1935-1942 (Sep. 1993).

A. Heinz, A. Haszler, C. Keidel, S. Moldenhauer, R. Benedictus, W.S. Miller, "Recent development in aluminium alloys for aerospace applications", Materials Science and Engineering A280 (2000) 102-107.

W.S. Miller, L. Zhuang, J. Bottema, A.J. Wittebrood, P. De Smet, A. Haszler, A. Vieregge, "Recent development in aluminium alloys for the automotive industry", Materials Science and Engineering A280 (2000) 37-49.

Vladivoj Ocenasek, Margarita Slamova, "Resistance to recrystallization due to Sc and Zr addition to Al—Mg alloys", Materials Characterization 47 (2001) 157-162.

Christian B. Fuller, Albert R. Krause, David C. Dunand, David N. Seidman, "Microstructure and mechanical properties of a 5754 aluminum alloy modified by Sc and Zr additions", Materials Science and Engineering A338 (2002) 8-16.

Y.W. Riddle and T.H. Sanders, Jr., "A Study of Coarsening, Recrystallization, and Morphology of Microstructure in Al—Sc—(Zr)—(Mg) Alloys", Metallurgical and Materials Transactions A, vol. 35A (Jan. 2004) 341.

Wen Yang, Desheng Yan and Lijian Rong, "The separation of recrystallization and precipitation processes in a cold-rolled Al—Mg—Sc solid solution", Scripta Materiala 68 (2013) 587-590.

Vahid Fallah, David J. Lloyd, Mark Gallerneault, "Processing and characterization of continuous-cast AlMgSc(Zr) sheets for improved strength", Materials Science and Engineering A, vol. 698, Jun. 20, 2017, pp. 88-97.

\* cited by examiner

Tensile Test Results
(Tensile Samples at 0.3 mm Cold-rolled from 10mm + Heat Treatment)

| Alloy | CR gauge (mm) | Heat Treatment | YS (MPa) | UTS (MPa) | %El |
|---|---|---|---|---|---|
| Base (A297) | 0.3 | As-rolled | 315 | 320 | 1.4 |
| | | Pre-aged | 53 | 159 | 18.9 |
| | | Braze1 | 53 | 158 | 27.7 |
| | | Braze2 | 52 | 160 | 22.2 |
| 0.2Sc-0.12Zr-0.14Mg-1.5Mn (A298) | 0.3 | As-rolled | 280 | 282 | 1.76 |
| | | Pre-aged | 172 | 213 | 10.2 |
| | | Braze1 | 98 | 167 | 14 |
| | | Braze2 | 62 | 146 | 8.2 |
| 0.1Sc-0.12Zr-0.14Mg-1.5Mn (A299) | 0.3 | As-rolled | 271 | 274 | 2.1 |
| | | Pre-aged | 156 | 194 | 11.2 |
| | | Braze1 | 42 | 118 | 20.7 |
| | | Braze2 | 48 | 116 | 18.1 |
| 0.2Sc-0.12Zr-0.15Mg-0.77Mn (A300) | 0.3 | As-rolled | 248 | 253 | 1.9 |
| | | Pre-aged | 164 | 197 | 11.3 |
| | | Braze1 | 87 | 147 | 12.6 |
| | | Braze2 | 48 | 109 | 13.2 |
| 0.2Sc-0.12Zr-1.5Mn (A331) | 0.3 | As-rolled | 280 | 289 | 2.7 |
| | | Pre-aged | 155 | 183 | 16.1 |
| | | Braze1 | 74 | 142 | 14.4 |
| | | Braze2 | 48 | 118 | 23.1 |

Pre-age treatment: Ramped at 50 °C/hr to 350 °C aged for 2 hrs, cooled at 50 °C/hr to ~100 °C
** Tensile data are average of results from 3 specimens

FIG. 14

Effect of Processing on Recrystallisation Summary

| Alloy | CR gauge | Recrystallization Status at Different Tempers ||||| Yield Strength - CR-Braze (MPa) ||
| --- | --- | --- | --- | --- | --- | --- | --- | --- |
| | | CR-Ag450 | CR-Ag450-An590 | CR-An590 | CR-Braze 1 | CR-Braze 2 | Braze 1 | Braze 2 |
| Base (A297) | 2.5 | Full | Full | Full | | | | |
| | 0.5 | Full | Full | Full | | | | |
| | 0.3 | Full | Full | Full | Full | Full | 52.5 | 52.5 |
| 0.25Sc-0.12Zr-0.14Mg-1.5Mn (A298) | 2.5 | None | None | None | | | | |
| | 0.5 | None | Near-Full | None | | | | |
| | 0.3 | None | Partial | None | Partial | Partial | 98.2 | 81.7 |
| 0.35Sc-0.12Zr-0.14Mg-1.5Mn (A299) | 2.5 | None | Full | Full | | | | |
| | 0.5 | None | Full | Full | | | | |
| | 0.3 | None | Full | Full | Full | Full | 42.1 | 45 |
| 0.25Sc-0.12Zr-0.15Mg-0.77Mn (A300) | 2.5 | None | None | None | | | | |
| | 0.5 | None | Near-Full | None | | | | |
| | 0.3 | None | Near-Full | None | Partial | Near-Full | 87 | 48.9 |
| 0.25Sc-0.12Zr-1.54Mn (A331) | 2.5 | None | None | None | | | | |
| | 0.5 | None | Partial | None | | | | |
| | 0.3 | None | Partial | None | Near-Full | Full | 74.2 | 47.5 |

Ag450: Ramped at 50 °C/hr to 450 °C, aged for 4 hrs, cooled at 50 °C/hr to ~100 °C
An590: Annealed at 590 °C for 0.5 hr

CONTROL OF RECRYSTALLIZATION IN COLD-ROLLED ALMN(MG)SCZR SHEETS FOR BRAZING APPLICATIONS

CROSS-REFERENCE TO RELATED APPLICATION

This application claims the benefit of priority of U.S. Patent Application No. 62/691,545, filed Jun. 28, 2018, having the same inventor and entitled "CONTROL OF RECRYSTALLIZATION IN COLD-ROLLED AlMn(Mg)ScZr SHEETS FOR BRAZING APPLICATIONS," which is incorporated herein by reference in its entirety. This application also claims the benefit of priority of U.S. Patent Application No. 62/823,647, filed Mar. 25, 2019, having the same inventor and entitled "CONTROL OF RECRYSTALLIZATION IN COLD-ROLLED AlMn(Mg)ScZr SHEETS FOR BRAZING APPLICATIONS," which is incorporated herein by reference in its entirety.

FIELD OF THE DISCLOSURE

The present disclosure relates generally to the processing of metal alloys, and more particularly to systems and methodologies for controlling recrystallization of AlMn(Mg)ScZr alloys in applications such as brazing.

BACKGROUND OF THE DISCLOSURE

Brazing is a widely-used joining technique for aluminum alloys. In a typical brazing operation, two parts to be joined together are brought into close proximity with each other to form a joint. A filler metal having a melting temperature which is lower than the melting temperature of the parts being joined together is then melted and flowed into the joint via capillary action, thus resulting in a strong joint. Applications of brazing are common in the fabrication of aircraft structures and heat exchangers. For example, brazing is commonly used to attach heat fins to a tubing substrate in the fabrication of automotive heat exchangers.

SUMMARY OF THE DISCLOSURE

In one aspect, a method is provided for fabricating an article from an aluminum alloy. The method comprises providing an aluminum alloy containing (a) at least 0.04 wt % Sc (but preferably no more than 0.1 wt % Sc), (b) at least 0.5 wt % Mn, (c) at least 0.05 wt % Zr, (d) at least 0.05 wt % Mg, and (e) at least 90 wt % Al; casting the alloy into a sheet; subjecting the cast alloy to a thermal cycle which includes raising the temperature of the alloy along a first temperature gradient, holding the temperature of the alloy at a temperature T for a period of time t, and reducing the temperature of the alloy along a second temperature gradient; and utilizing the sheet in a brazing operation.

In another aspect, a method for fabricating an article from an aluminum alloy is provided. The method comprises providing an aluminum alloy containing (a) at least 0.04 wt % Sc (but preferably no more than 0.1 wt % Sc), (b) at least 0.5 wt % Mn, (c) at least 0.05 wt % Zr, (d) at least 0.05 wt % Mg, and (e) at least 90 wt % Al; casting the alloy into a sheet; coating the sheet with a solder composition; forming the coated sheet into an article in which the solder composition is proximal to, but not attached to, an adjacent portion of the alloy; and subjecting the article to a brazing process such that the solder composition undergoes melting and re-solidification, and thereby forms a solder joint to the adjacent portion of the alloy, thus resulting in a brazed article.

In a further aspect, a heat exchanger is provided which comprises a tube; and a plurality of fins attached to said tube with a solder composition; wherein said fins comprise a scandium-containing aluminum alloy, and wherein said alloy has a yield strength of greater than 100 MPa.

In still another aspect, a heat exchanger is provided which comprises a tube; and a plurality of fins attached to said tube with a solder composition; wherein said fins comprise a first aluminum alloy, and wherein said first aluminum alloy contains (a) at least 0.04 wt % Sc (but preferably no more than 0.1 wt % Sc), (b) at least 0.5 wt % Mn, (c) at least 0.05 wt % Zr, (d) at least 0.05 wt % Mg, and (e) at least 90 wt % Al.

In yet another aspect, an aluminum alloy is provided which contains (a) at least 0.04 wt % Sc (but preferably no more than 0.1 wt % Sc), (b) at least 0.5 wt % Mn, (c) at least 0.05 wt % Zr, (d) at least 0.05 wt % Mg, and (e) at least 90 wt % Al.

In another aspect, a method is provided for producing an alloy. The method comprises providing a first alloy comprising aluminum, magnesium and manganese, wherein the first alloy comprises at least 90 wt % aluminum; and adding scandium and zirconium to the first alloy, thereby producing a second alloy, wherein the second alloy comprises at least 0.04 wt % scandium and at least 0.12 wt % zirconium.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 15 is a table demonstrating the effect of processing on recrystallization. The alloy samples denoted "Ag450" were subjected to a heat treatment in which temperature was ramped at 50° C./hr to 450° C., followed by aging for 4 hours, followed by cooling at 50° C./hr to about 100° C. The alloy samples denoted "An590" were annealed at 590° C. for 0.5 hours.

FIG. 14 is a table of tensile test results for a series of alloys which were subjected to 0.3 mm cold rolling (from 10 mm) followed by heat treatment.

FIG. 15 FIG. 11 is a table demonstrating the effect of processing on recrystallization.

DETAILED DESCRIPTION

A. Terms and Terminology

Figure 1:
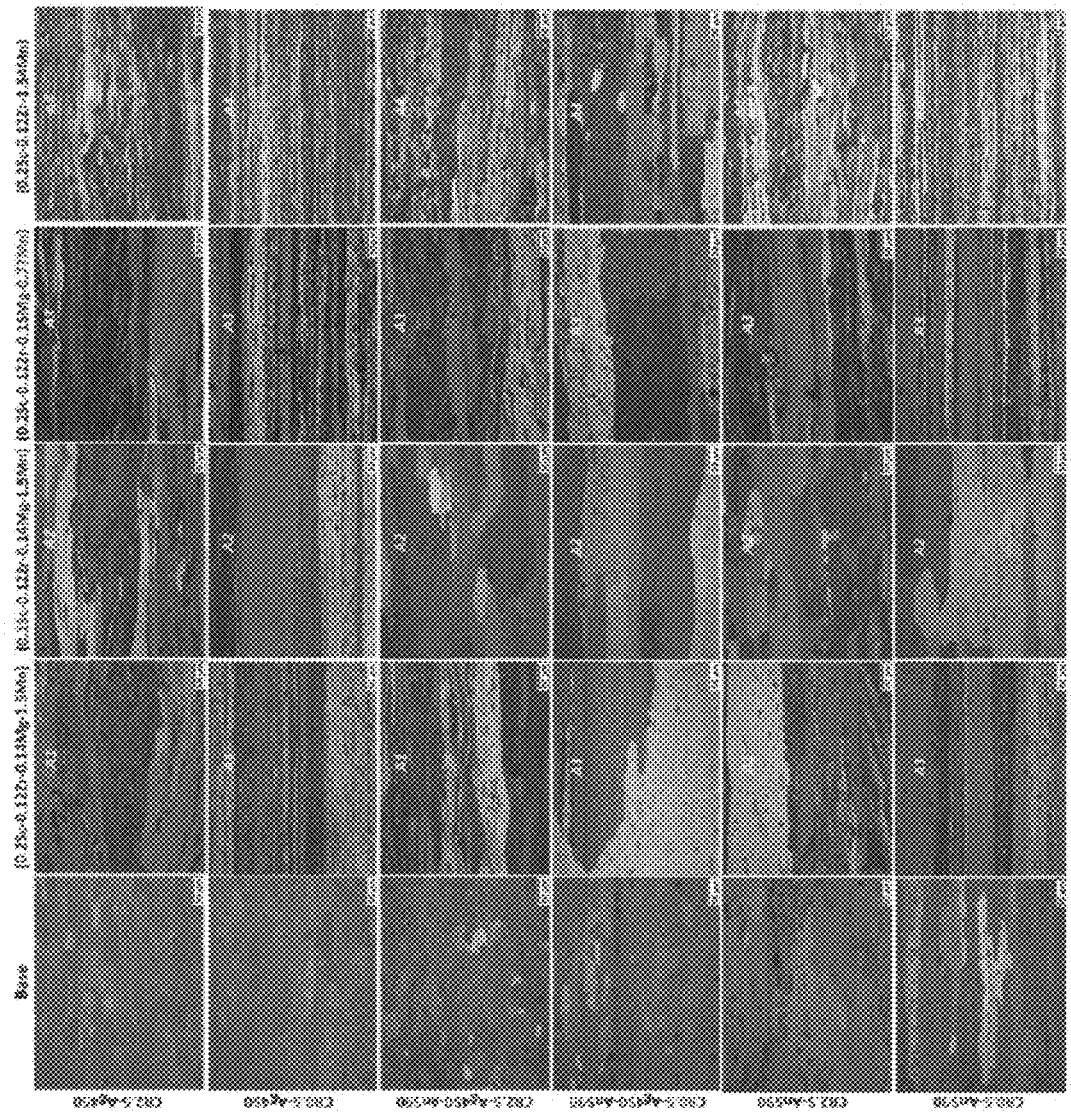
FIG. 1 is a series of optical micrographs of microstructures for various alloys under various processing conditions, as revealed by the application of Barker's Etch. The matrix of images is cross-labeled by alloy composition from the top row and the processing condition from the left column.

The following terms as used herein have the meanings indicated below.

Weight percent (wt %) or mass %, as used in reference to a component in an alloy, is the percentage of the component by weight in the alloy, based on the total weight of the alloy. Thus, for example, if an alloy consists only of components A, B and C in amounts by weight of $w_A$, $w_B$ and $w_C$, the weight percentage of A is given by EQUATION 1:

$$\text{wt \% } A = [w_A/(w_A + w_B + w_C)] \times 100 \quad \text{(EQUATION 1)}$$

It follows that wt % A+wt % B+wt % C=100.

B. Overview and Summary

The thickness of aluminum alloy sheets used in the fabrication of automotive heat exchangers is typically minimized to reduce the weight of the heat exchanger. A significant amount of research has been devoted to determining the minimum thickness that can be used in these sheets while still obtaining the requisite mechanical properties. Typically, these sheets are subject to rolling, forming and other mechanical work to improve their mechanical strength and other physical properties.

Aluminum alloy sheets are subjected to significant localized heating (often on the order of 600° C.) during a typical brazing operation. These temperatures are high enough to induce recrystallization in the aluminum alloy. Unfortunately, recrystallization of the alloy may cause it to undergo softening and to lose some or all of the strength imparted to it by the initial working of the alloy. For example, recrystallization may result in the formation of inhomogeneous microstructures in the alloy, which may give rise to anisotropic mechanical properties and low corrosion resistance across the sheet.

The X900 Al—Mn alloy series was specifically developed to provide higher strength and enhanced corrosion resistance as compared to the traditionally-used AA3003 alloy. These properties make the X900 alloy series very desirable for automotive heat exchanger applications. Unfortunately, X900 alloys exhibit low recrystallization resistance at normal brazing temperatures. There is thus a need in the art for aluminum alloys which may be utilized in automotive heat exchanger applications, and which are resistant to recrystallization during brazing. There is further a need in the art for systems and methodologies for processing aluminum sheeting which minimize recrystallization in the component alloys. There is also a need in the art for scandium-containing alloy systems that allow the amount of scandium to be reduced or minimized. These and other needs may be met with the compositions, systems and methodologies disclosed herein.

It has now been found that the recrystallization behavior of X900 alloys under brazing conditions may be modified by introducing Sc, Zr, Mn and Mg into the system or by appropriately varying the concentration of these elements. Modified alloys may be made by this approach which exhibit significant recrystallization resistance at typical brazing temperatures. Without wishing to be bound by theory, this resistance to recrystallization is believed to be due to the formation of coherent, nanoscale $Al_3(ScZr)$ precipitates in the alloy. These precipitates are believed to effectively impede grain boundaries, while also exhibiting very slow coarsening kinetics at high temperatures.

While scandium addition to X900 alloy systems may be utilized to improve recrystallization resistance of the alloys at typical brazing temperatures, scandium is a relatively expensive metal due, in part, to the lack of naturally occurring scandium deposits that contain concentrated levels of the mineral. There is thus a need in the art for scandium-containing alloy systems that allow the amount of scandium to be reduced or minimized, without adversely affecting the advantageous properties of these systems. In particular, there is a need in the art for scandium-containing X900 alloy systems in which the amount of scandium in these systems has been reduced or minimized, without adversely affecting the recrystallization resistance of the alloy.

It has now been found that zirconium and rare earth metals (especially erbium, yttrium and cerium) may be utilized as replacements in some applications for some of the scandium content in scandium-containing alloy systems, and especially in X900 alloy systems. In particular, it has been found that the amount of Zr and/or rare earth metals in these systems may be leveraged to control the size of the $Al_3Sc$ inter-metallic crystals. This, in turn, may control or reduce recrystallization of these alloys, and may thus prevent the mechanical properties of these alloys from being compromised during reheating or brazing. For example, in some embodiments and applications, approximately half of the scandium may be replaced by zirconium without significantly compromising the recrystallization resistance of the alloy.

It will be appreciated from the foregoing that there is also a need in the art for systems and methodologies for processing aluminum sheeting which minimize recrystallization in the component alloys. It has now been found that recrystallization behavior may be modified by choice of processing route. In particular, it has been found that recrystallization may be minimized by suitable pre-aging stabilization treatment and cold-roll reduction. In a preferred embodiment, recrystallization is minimized by introducing a pre-aging stabilization treatment into the processing route prior to the final brazing anneal. In an especially preferred embodiment, recrystallization is further minimized by subjecting cold-roll reduction to suitable variation prior to the final brazing anneal.

C. Materials and Procedures

The following materials and procedures were utilized in the examples set forth herein as hereinafter described.

Alloys and Preparation Thereof

A class of alloys utilized in these examples (which also represent a preferred class of alloys that may be utilized in the systems and methodologies disclosed herein) has the composition depicted in TABLE 1 below. In a preferred embodiment of a method disclosed herein, the foregoing alloy is cast into a sheet. The cast alloy is then subjected to a thermal cycle which includes raising the temperature of the alloy along a first temperature gradient, holding the temperature of the alloy at a temperature T for a period of time t, and reducing the temperature of the alloy along a second temperature gradient. The resulting sheet is especially useful in the manufacture of articles subject to a brazing operation such as, for example, brazing operations of the type utilized in automotive heat exchanger applications.

TABLE 1

| Preferred Alloy Composition | |
|---|---|
| Element | % Weight (based on the total weight of the alloy) |
| Sc | >0.1 |
| Mn | ≥0.5 |
| Zr | ≥0.05 |
| Mg | ≥0.05 |
| Al | ≥90 |

The advantages of the class of aluminum alloys depicted in TABLE 1 may be further appreciated with respect to the following particular, non-limiting examples. These examples illustrate the effect of aluminum alloy composition (i.e. Mn, Mg, Sc, Zr content), cold-roll reduction and pre-aging treatment on the recrystallization behavior of cold-rolled sheets at the brazing temperatures typically used during the manufacture of heat exchanger units. The analysis of recrystallization behavior was carried out through microstructural characterization, and the results were compared with the behavior of a commercial, AA3xxx-based heat exchanger alloy. The following procedures were used in these examples.

Cold Rolling

The samples used in the following examples were cold rolled from their 10 mm cast gauge to thicknesses of 2.5 mm, 0.5 mm or 0.3 mm. Cold rolling is a process which is well-known in the art, and typically involves compressing a metal sheet between rollers at a temperature below the recrystallization temperature of the metal. Cold rolling is often found to increase the yield strength and hardness of the metal.

Pre-Ageing Procedure

In this procedure, cold-rolled samples were ramped at 50° C./hr to a predetermined temperature threshold (PMT), held there for four hours, and then cooled at a reverse ramp of 50° C./hr. PMTs of 250° C., 300° C., 350° C., 400° C. and 450° C. were studied. This procedure was intended to encourage precipitation of $Al_3$(Sc, M) fine particles from the Al matrix, where M is at least one element selected from the group consisting of Zr and rare earth metals, and is preferably Zr.

Isothermal Annealing

This process was conducted at 590° C. for 30 minutes to reveal the effects of crystallization at a typical CAB (controlled atmosphere brazing) temperature.

Brazing Cycles

Two brazing cycles were utilized in the examples described herein. Brazing Cycle #1 (see FIG. 6) was a 100-minute cycle, and Brazing Cycle #2 (see FIG. 8) was a 30-minute cycle. In both cycles, the temperature of the samples was ramped to 590° C., held there for 5 minutes, and cooled in air.

Barker's Etch

Barker's etch is a process which is well-known in the art for revealing grain structures in wrought alloys. It involves etching the sample with Barker's Reagent (1.8% fluoboric acid in water) followed by anodization at 20-45 V dc for up to 2 minutes. The resulting samples are typically examined with crossed polarized light used in conjunction with a sensitive tint (first order red plate, or λ plate) to allow the microstructure to be seen in color. This process is useful for revealing grain size and the presence of dendrites.

Grain Structure Image Designations

The effect of processing route on grain structure was determined for each of several processing variations, and the associated grain structures were imaged. These images were given the designations in TABLE 2 below.

TABLE 2

Grain Structure Image Designations

| Processing Variation | Image Designation |
|---|---|
| After cold rolling to 2.5 mm | CR2.5 |
| After cold rolling to 2.5 mm and ageing at 450° C. | CR2.5-Ag450 |
| After cold rolling to 2.5 mm and isothermally annealing at 590° C. | CR2.5-An590 |
| After cold rolling to 2.5 mm, ageing at 450° C. and isothermally annealing at 590° C. | CR2.5-Ag450-An590 |
| After cold rolling to 0.5 mm | CR0.5 |
| After cold rolling to 0.5 mm and ageing at 450° C. | CR0.5-Ag450 |
| After cold rolling to 0.5 mm and isothermally annealing at 590° C. | CR0.5-An590 |
| After cold rolling to 0.5 mm, ageing at 450° C. and isothermally annealing at 590° C. | CR0.5-Ag450-An590 |
| After cold rolling to 0.3 mm and ageing at 450° C. | CR0.3-Ag450 |
| After cold rolling to 0.3 mm and isothermally annealing at 590° C. | CR0.3-An590 |
| After cold rolling to 0.3 mm, ageing at 450° C. and isothermally annealing at 590° C. | CR0.3-Ag450-An590 |
| After cold rolling to 0.3 mm and braze 1 | CR0.3-Braze 1 |
| After cold rolling to 0.3 mm and braze 2 | CR0.3-Braze 2 |

D. Examples

The following examples further illustrate some of the features of the systems and methodologies disclosed herein.

Example 1

A series of alloys with the chemical compositions listed in TABLE 3 (see below) were cast in the form of 10 mm-thick book molds. The as-cast ingots were cold-rolled down to gauges of 2.5 mm, 0.5 mm and 0.3 mm (hereinafter referred to as CR2.5, CR0.5 and CR0.3, respectively), and were selectively subjected to the Pre-Ageing Procedure, Isothermal Annealing and Brazing Cycles described above.

Half of the cold-rolled sheets underwent the Pre-Aging Procedure, followed by the Isothermal Annealing treatment. These samples are referred to hereinafter as CR2.5-Ag450-An590 and CR0.5-Ag450-An590. The other half of the samples were directly annealed at 590° C. These samples are referred to hereinafter as CR2.5-An590 and CR0.5-An590.

Example 2

The evolution of microstructure and phases at various conditions were studied using Optical Microscopy and Scanning Electron Microscopy (SEM). For optical microscopy, specimens were cut from the longitudinal cross-section of the rolled/heat-treated sheet. The specimens were mounted in Bakelite and then mechanically ground using SiC grinding papers, followed by fine polishing with diamond suspensions and then finished with colloidal silica. The polished specimens were etched with Barker's etch at 30V. SEM was performed using a JEOL microscope (JSM-5800) operated at 20 keV and 10 mm working distance. Energy Dispersive Spectroscopy (EDS) was performed using an Oxford Instruments INCA system.

Microstructures in the samples were revealed by Barker's Etch for various alloys and conditions. The evolution of anodized grains upon etching in Barker's solution can be used to determine whether recrystallization has occurred, or whether the original cold-rolled grain structure has remained intact.

Figure 2:
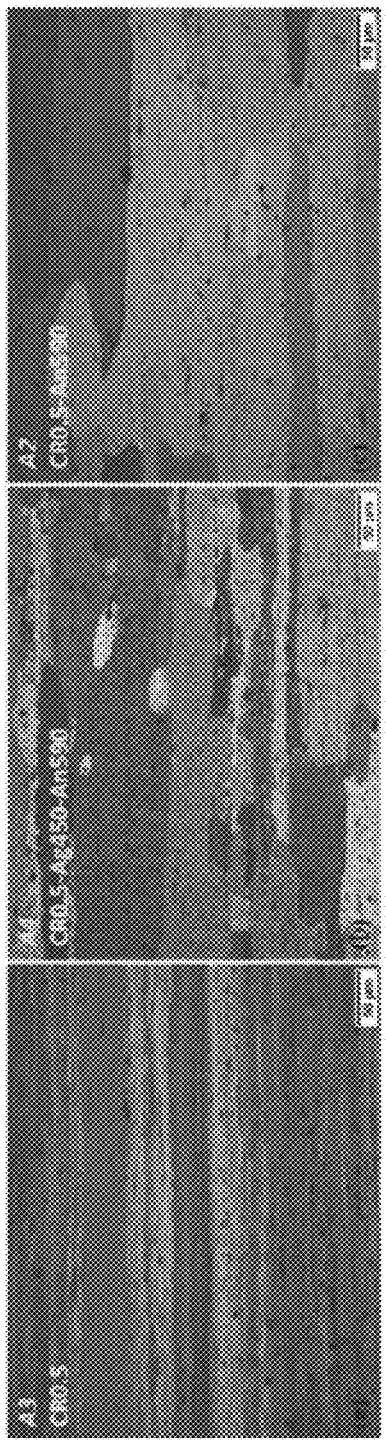
FIG. 2 is a series of optical micrographs showing examples of microstructures as revealed by the application of Barker's Etch. The micrographs were taken from cold-rolled alloys which were (a) unrecrystallized, (b) partially recrystallized and (c) fully recrystallized.

To highlight the criterion used to determine the recrystallization status of the microstructures, examples of unrecrystallized, partially recrystallized and fully recrystallized microstructures are presented in FIG. 2. In an "unrecrystallized" microstructure, the fibrous grains originated during the previous cold-roll remain unchanged upon the subsequent heat treatments (see FIG. 2(a)). A "fully recrystallized" microstructure, such as that shown in FIG. 2(c),

TABLE 3

Chemical Composition of Alloys

| Alloy | $Sc^N$ (wt. %) | $Sc^M$ (wt. %) | Zr (wt. %) | Mg (wt. %) | Mn (wt. %) | Cu (wt. %) | Comments |
|---|---|---|---|---|---|---|---|
| A297 | 0 | 0 | 0 | 0.14 | 1.42 | 0.65 | Baseline X901 tubestock |
| A298 | 0.2 | 0.19 | 0.12 | 0.14 | 1.5 | 0 | Cu-free, Sc-containing X900 |
| A299 | 0.1 | 0.989 | 0.12 | 0.14 | 1.5 | 0 | Lower Sc variant |
| A300 | 0.2 | 0.21 | 0.12 | 0.15 | 0.77 | 0 | Lower Mn variant |
| A331 | 0.2 |  | 0.123 | 0 | 1.54 | 0 | Mg-free variant |
| A424 | 0.1 |  | 0.12 | 0.15 | 1.99 | 0 | High Mn, Low Sc |
| A425 | 0.15 |  | 0.12 | 0.15 | 1.99 | 0 | High Mn, Med. Sc |
| A426 | 0.2 |  | 0.12 | 0.15 | 1.99 | 0 | High Mn, High Sc | exhibits a network of recrystallized grains stretched along the original cold-roll texture. A "partially recrystallized" microstructure exhibits a combination of a fibrous cold-worked grain structure and elongated recrystallized grains. The recrystallized grains in the Al—Sc system tend to form an elongated texture along the previous coldworked texture orientation, based on a phenomenon called "Extensive Recovery" or "Continuous Recrystallization". Using such a criterion, the recrystallization status of various alloys and conditions was determined and is summarized in TABLE 4.

TABLE 4

Recrystallization Status for Various Alloys and Conditions

| Alloy | Cold-Roll Gauge (mm) | Recrystallization Status at Different Temperatures | | |
|---|---|---|---|---|
| | | CR-Ag450 | CR-Ag450-An590 | CR-An590 |
| B | 2.5 | Full | Full | Full |
| | 0.5 | Full | Full | Full |
| A1 (0.2Sc—0.12Zr—0.14Mg—1.5Mn) | 2.5 | None | None | None |
| | 0.5 | None | Partial | None |
| A2 (0.1Sc—0.12Zr—0.14Mg—1.5Mn) | 2.5 | None | Full | Full |
| | 0.5 | None | Full | Full |
| A3 (0.2Sc—0.12Zr—0.15Mg—0.77Mn) | 2.5 | None | None | None |
| | 0.5 | None | Partial | None |
| A4 (0.2Sc—0.123Zr—1.54Mn) | 2.5 | None | None | None |
| | 0.5 | None | Partial | None |

Following the data listed in TABLE 4, the effect of alloy composition, pre-aging and cold-rolling reduction on recrystallization behavior can be summarized as follows.

With respect to alloy composition, it can be seen that the role of Sc is significant. At 0 wt % Sc (base alloy, B), full recrystallization occurs at all process conditions. At 0.1 wt % Sc (A2 alloy), recrystallization is prevented at the pre-aged state, but occurs at the annealed state (with or without the pre-age). At 0.2 wt % Sc, recrystallization is prohibited for all 2.5 mm-thick sheets at the annealed state (with or without preage) and for 0.5 mm-thick samples at the directly-annealed state only. The Mn and Mg content (within the range examined here) has no visible effect on the recrystallization behavior of various alloys and conditions.

With respect to the effect of cold-roll reduction, it will be appreciated that the cold-rolling reduction determines the amount of cold-work introduced to the metal (and thus the amount of stored energy). This has a significant impact on the recrystallization behavior during the subsequent anneal. In particular, increasing the cold-rolling reduction appears to enhance recrystallization upon subsequent annealing. At 2.5 mm thickness, alloys containing 0.2 Sc (A1, A3 & A4) do not recrystallize in the annealed state (with or without pre-age). By contrast, at 0.5 mm thickness, recrystallization is inhibited only at the directly-annealed state and for alloys containing at least 0.2Sc (A1, A3 & A4).

With respect to the effect of pre-aging, it was found that pre-aging at 450° C. promotes recrystallization upon subsequent annealing of all 0.5 mm-thick samples. However, such pre-aging does not appear to affect the 2.5 mm-thick samples. The effect of pre-aging at lower temperatures was not explored, but may be important in some applications.

Figure 3:
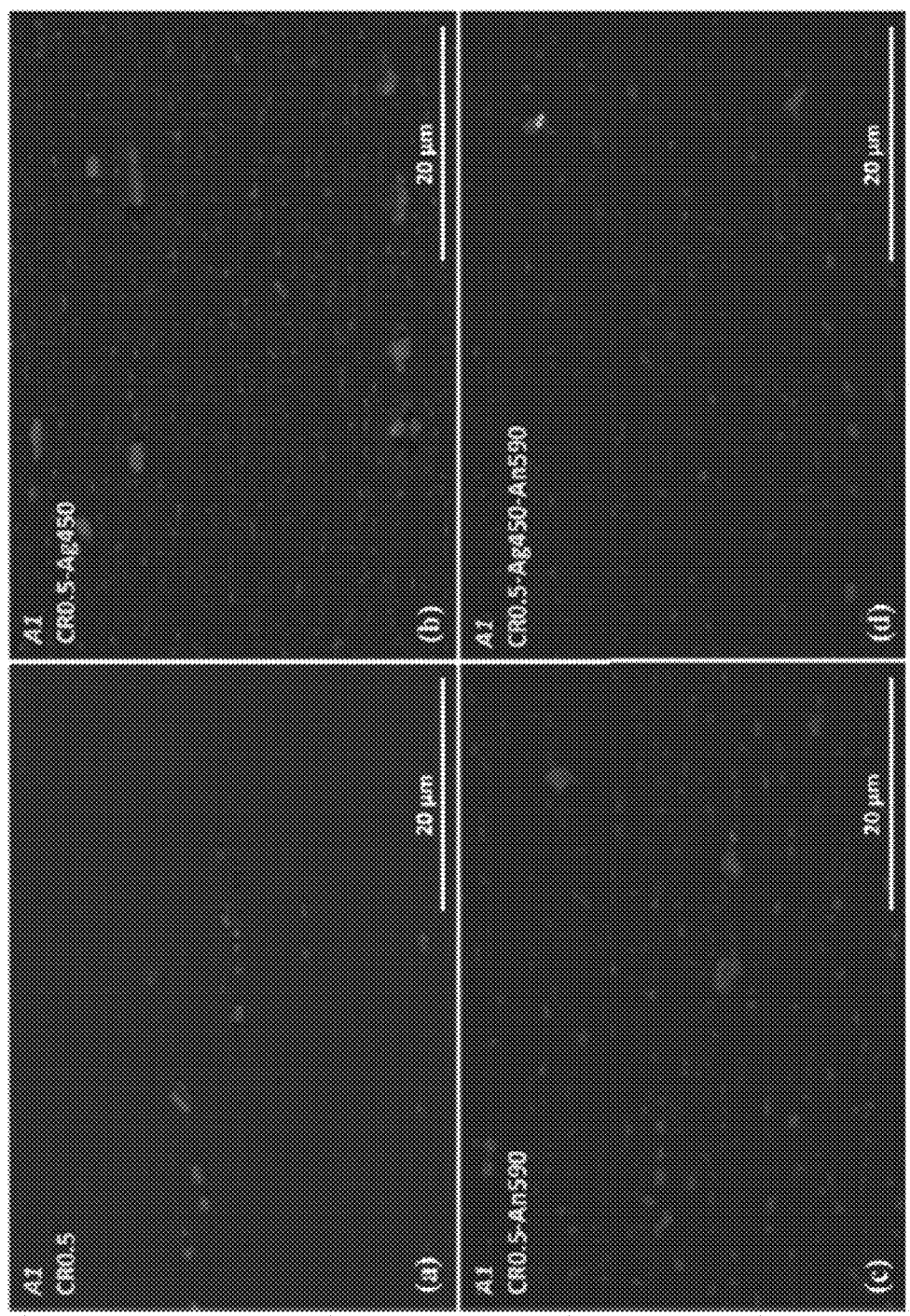
FIG. 3 is a series of backscatter SEM micrographs showing the evolution of intermetallics and dispersoids in 0.5 mm thick aluminum alloy A1 (Al-0.2Sc-0.12Zr-0.14Mg-1.5Mn) sheets in (a) a cold-rolled state, (b) a pre-aged state, (c) a directly annealed state, and (d) a pre-aged+annealed state.
Figure 4:
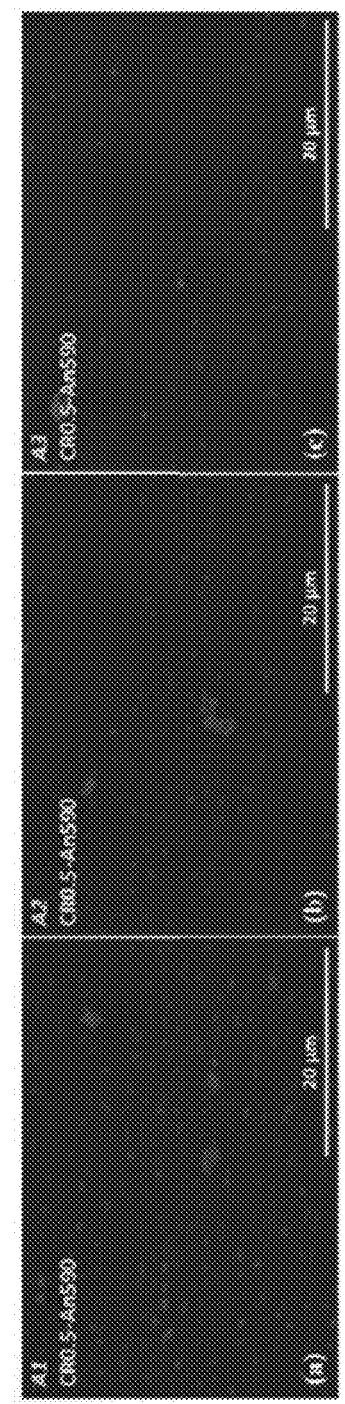
FIG. 4 is a series of backscatter SEM micrographs of the evolution of intermetallics/dispersoids in 0.5 mm thick aluminum alloy sheets in a directly-annealed state. The alloys are (a) A1 (Al-0.2Sc-0.12Zr-0.14Mg-1.5Mn), (b) A2 (Al-0.1Sc-0.12Zr-0.14Mg-1.5Mn) and (c) A3 (Al-0.2Sc-0.12Zr-0.14Mg-0.77Mn).

To further analyze the recrystallization behavior, the evolution of phases was characterized using the SEM observations for select sheet samples at 0.5 mm thickness, with emphasis on the effect of pre-aging in FIG. 3 and the effect of Sc content in FIG. 4. As shown in FIG. 3(a), the cold-rolled microstructure reveals a random distribution of large particles, including broken-down (Mn,Fe)-rich intermetallics and large, Mn-rich dispersoids. The former forms originally during solidification in the form of inter-dendritic phases that are rich in both Fe and Mn. The latter forms in the solid state during cooling from solidification temperatures. Both phases get crushed during the subsequent cold-rolling, appearing in the microstructure with relatively sharp edges.

FIG. 3(b) shows that pre-aging at 450° C. populates the microstructure with Mn rich precipitates, which also possess a Sc content slightly higher than the matrix (as determined by several point-EDX spectrums). During the subsequent anneal, a large portion of smaller precipitates dissolve back into solid solution, thus lowering the population of Mn-rich precipitates (this may be inferred by comparing the microstructures shown in FIG. 3(d) to those in FIG. 3(b)).

By contrast, the microstructure of a directly annealed sample (see FIG. 3(c)) reveals a bimodal matrix of very large phases (consisting of originally as-cast intermetallics and dispersoids coarsened and rounded upon annealing), as well as newly formed dispersoids formed upon annealing. Moreover, in the directly-annealed state, the alloys with higher Sc or Mn content (A1 vs. A2 or A1 vs. A3, respectively) exhibit a higher population of Mn-rich dispersoids, as may be inferred by comparing the microstructures shown in FIG. 4(a) to those of FIG. 4(b) and FIG. 4(c), respectively.

Two types of phases have been identified by the SEM observations of the microstructure in samples A1 to A4: (1) intermetallic phases that are rich in both Fe and Mn, and (2) dispersoids/precipitates that are mainly rich in Mn. Both phases also possess slightly higher Sc content than that in the matrix. There is also a third phase, Sc,Zr-rich precipitates $Al_3(Sc,Zr)$, that (similarly to Mn-rich precipitates) form during cooling from solidification temperatures as well as during pre-aging treatment and annealing. However, $Al_3(Sc, Zr)$ precipitates evolve coherently within the matrix from a few nanometers in size and, to a large extent, are resistant to coarsening, even at annealing temperatures.

$Al_3(Sc,Zr)$ precipitates are known to inhibit the grain boundary movement and thus to reduce the recrystallization kinetics during aging/annealing of AlScZr alloys. Without wishing to be bound by theory, it is believed that the Sc content controls the number, density and size evolution of $Al_3(Sc,Zr)$ precipitates, and thus plays a key role in controlling the recrystallization behavior of these alloys. The higher Sc content is also found to significantly increase the population of Mn-rich precipitates/dispersoids at the directly-annealed state, as can be seen by comparing FIG.

4(a) to FIG. 4(b). This explains why, in the low-Sc alloy (0.1% Sc as in A2), full recrystallization occurs at all conditions, while under specific conditions, it can be inhibited for the high-Sc alloys (0.2% Sc as in A1, A3, A4; see TABLE 3). Transmission Electron Microscopy (TEM) observations may be used to reveal the evolution of $Al_3(Sc,Zr)$ precipitates, and thus carry out an in-depth analysis of precipitation-recrystallization dynamics.

A higher Mn content in the alloy is found to increase the population of Mn-rich precipitates/dispersoids (compare A1 to A3 in FIG. 4). However, it does not appear to have a noticeable effect on the recrystallization behavior (see TABLE 2). This indicates that Mn-rich precipitates/dispersoids are not as effective as $Al_3(Sc,Zr)$ precipitates in impeding recrystallization.

A pre-aging treatment may be utilized in the methodologies disclosed herein to stabilize the microstructure prior to annealing (brazing) treatments. As a result of pre-aging at an intermediate temperature (i.e. 450° C.), a fine and uniform network of $Al_3(Sc,Zr)$ precipitates is found to develop in the microstructure. Without wishing to be bound by theory, this network of precipitates is believed to inhibit the grain boundary movement during the subsequent annealing treatment at higher temperatures (e.g., 590° C.). In contrast, upon direct annealing without pre-aging, precipitation occurs concurrently with recrystallization, in which case, their competitive kinetics is believed to control the degree of recrystallization.

Moreover, at annealing temperatures, coarsening kinetics are found to be significantly higher, and precipitates are observed to quickly evolve into large dispersoids with a lower population density. The pre-aging treatment is believed to stabilize the precipitate evolution and to reduce the coarsening kinetics upon subsequent annealing.

The selection of pre-aging temperature is typically a significant choice in the pre-aging treatment process. In particular, too high a pre-aging temperature may produce very large precipitates that have little to no effect on recrystallization. This appears to be the case for the pre-aging temperature (450° C.) chosen for the experimental work described herein. Thus, referring to TABLE 2, pre-aging has an adverse effect on resistance to recrystallization for all 0.5 mm-thick sheets, as opposed to direct annealing. This may be the result of implementing the pre-aging treatment at too high of a temperature, thus leading to the formation of a network of ineffective, large precipitates that may be even less effective than those developed via direct-annealing. Also, the SEM micrograph in FIG. 3(b) shows that, due to pre-aging, a large number density of coarse Mn-rich precipitates/dispersoids form in the microstructure. These precipitates, which also carry an Sc content higher than the surrounding matrix, cause a depletion in the amount of Sc in the solid-solution. This may reduce the precipitation kinetics of $Al_3Sc$ precipitates that form concurrently and during the subsequent anneal. It will be appreciated that additional studies may be conducted in which lower pre-aging temperatures are examined, as well as TEM observations of precipitate evolution, to better resolve the mechanisms controlling the precipitation-recrystallization behavior.

The cold-roll reduction is also found to have a significant impact on the recrystallization behavior, since it controls the amount of stored energy in the sheet prior to pre-aging and/or annealing. Referring to TABLE 2, all 2.5 mm-thick sheets (except for the base alloy, B, and the low-Sc alloy, A2) were found to be resistant to recrystallization under all conditions, while 0.5 mm-thick sheets of the same alloys were recrystallization-resistant only in the directly-annealed state.

It will be appreciated from the foregoing that alloy composition and thermomechanical processing route play a critical role in the recrystallization behavior of AlMn(Mg) ScZr alloys at normal brazing temperatures (~600° C.). The Sc content in the alloy may be the most significant factor, where a minimum of 0.2 wt % is typically required to prevent recrystallization regardless of the thermomechanical processing route taken. This points to a high dependency of recrystallization resistance on the population of $Al_3(Sc,Zr)$ precipitates, which is a strong function of Sc content in the alloy. The cold-roll reduction, and thus the amount of restored energy in the sheets prior to brazing, is also found to have a significant impact on the recrystallization behavior (for example, 2.5 mm-thick sheets are much more resistant to recrystallization than 0.5 mm-thick sheets). Pre-aging stabilizing treatment at 450° C. appears to have an adverse effect on the recrystallization resistance. Without wishing to be bound by theory, it is believed that a pre-aging temperature of 450° C. may have created a scarce network of large precipitates that are ineffective agents for grain boundary impingement during the subsequent anneal at the brazing temperature. The pre-aging temperature may be optimized, for example, through an in-depth TEM analysis of precipitates evolution.

Example 3

EXAMPLE 2 was repeated for a further series of alloys and processing conditions. Several micrographs were generated from these samples.

Figure 5:
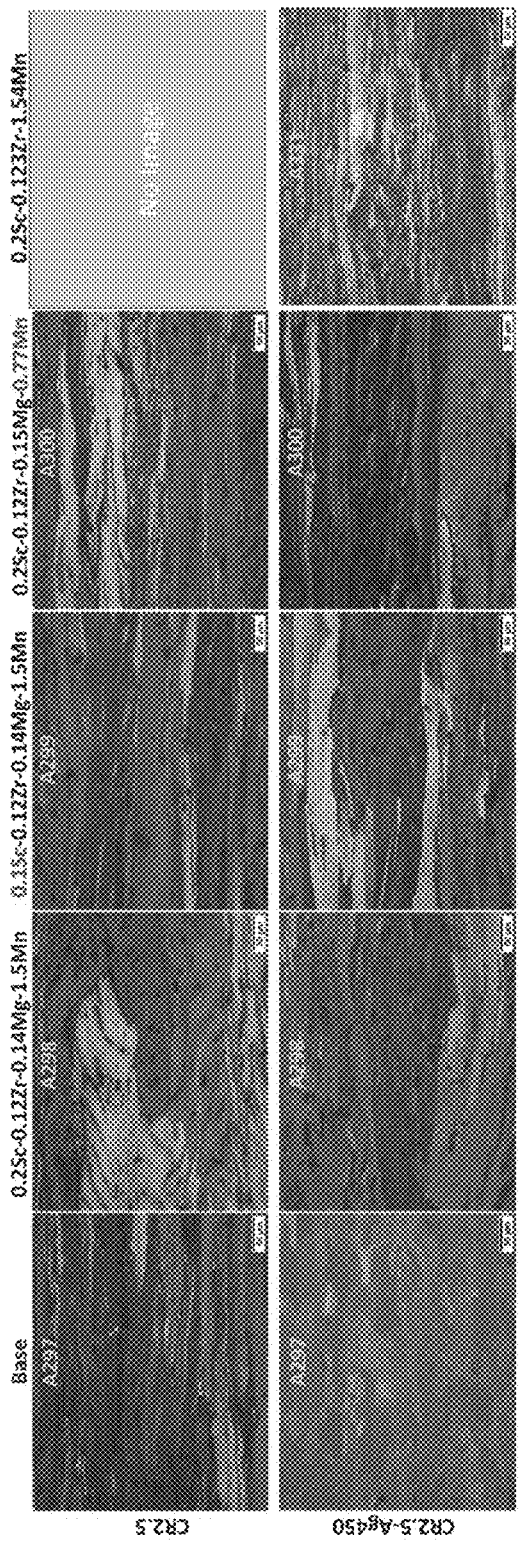
FIG. 5 is a series of optical micrographs of microstructures for various alloys, as revealed by the application of Barker's Etch. The matrix of images is cross-labeled by alloy composition from the top row and the processing condition (in this case, cold-rolling at 2.5 mm) from the left column. The alloys denoted "Ag450" were ramped at 50° C./hr to 450° C., aged for 4 hours, and cooled at 50° C./hr to about 100° C.

FIG. 5 is a series of optical micrographs of microstructures for the various alloys, as revealed by the application of Barker's Etch. The matrix of images is cross-labeled by alloy composition from the top row and the processing condition (in this case, cold-rolling at 2.5 mm) from the left column. The alloys denoted "Ag450" were ramped at 50° C./hr to 450° C., aged for 4 hours, and cooled at 50° C./hr to about 100° C.

Figure 6:
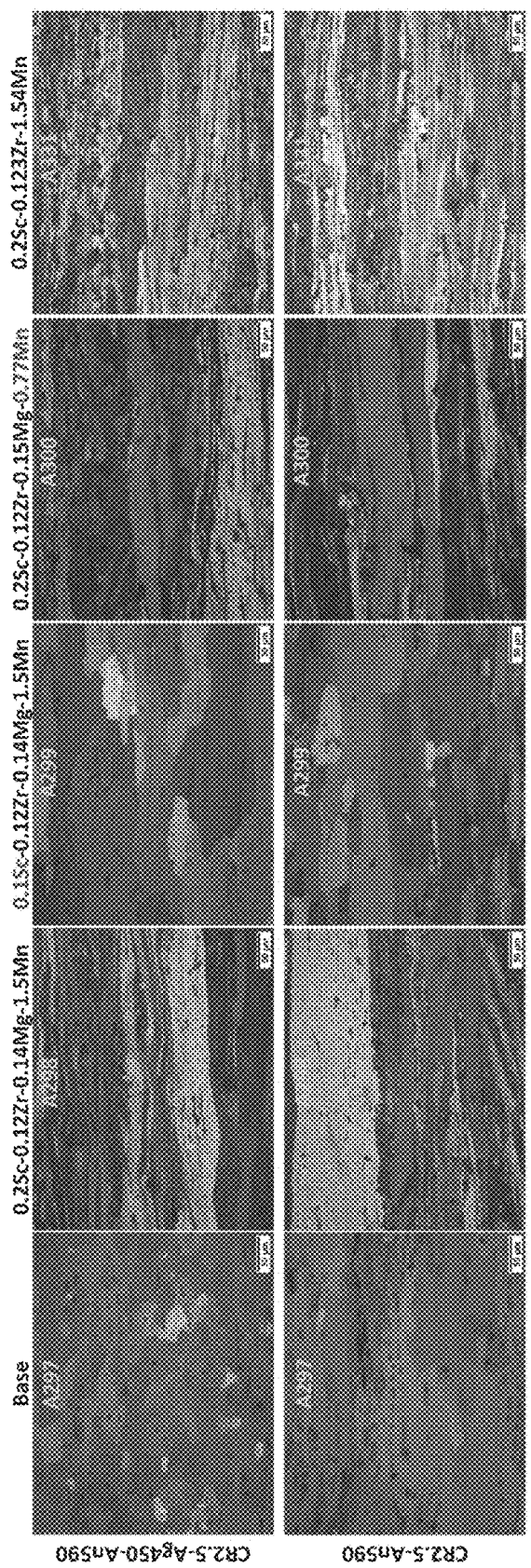
FIG. 6 is a series of optical micrographs of microstructures for various alloys, as revealed by the application of Barker's Etch. The matrix of images is cross-labeled by alloy composition from the top row and the processing condition (in this case, cold-rolling at 2.5 mm) from the left column. The alloys denoted "Ag450" were ramped at 50° C./hr to 450° C., aged for 4 hours, and cooled at 50° C./hr to about 100° C. The alloys denoted "An590" were annealed at 590° C. for 0.5 hr.

FIG. 6 is a series of optical micrographs of microstructures for various alloys, as revealed by the application of Barker's Etch. The matrix of images is cross-labeled by alloy composition from the top row and the processing condition (in this case, cold-rolling at 2.5 mm) from the left column. The alloys denoted "Ag450" were ramped at 50° C./hr to 450° C., aged for 4 hours, and cooled at 50° C./hr to about 100° C. The alloys denoted "An590" were annealed at 590° C. for 0.5 hr.

Figure 7:
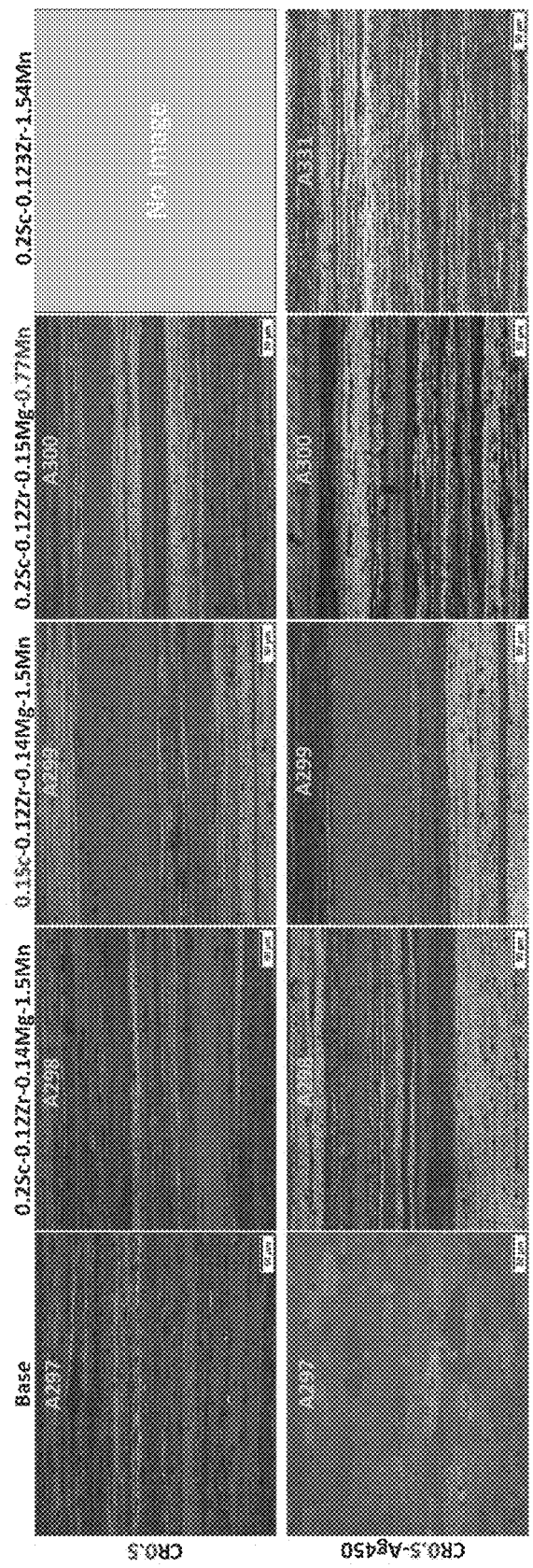
FIG. 7 is a series of optical micrographs of microstructures for various alloys, as revealed by the application of Barker's Etch. The matrix of images is cross-labeled by alloy composition from the top row and the processing condition (in this case, cold-rolling at 0.5 mm) from the left column. The alloys denoted "Ag450" were ramped at 50° C./hr to 450° C., aged for 4 hours, and cooled at 50° C./hr to about 100° C.

FIG. 7 is a series of optical micrographs of microstructures for various alloys, as revealed by the application of Barker's Etch. The matrix of images is cross-labeled by alloy composition from the top row and the processing condition (in this case, cold-rolling at 0.5 mm) from the left column. The alloys denoted "Ag450" were ramped at 50° C./hr to 450° C., aged for 4 hours, and cooled at 50° C./hr to about 100° C.

Figure 8:
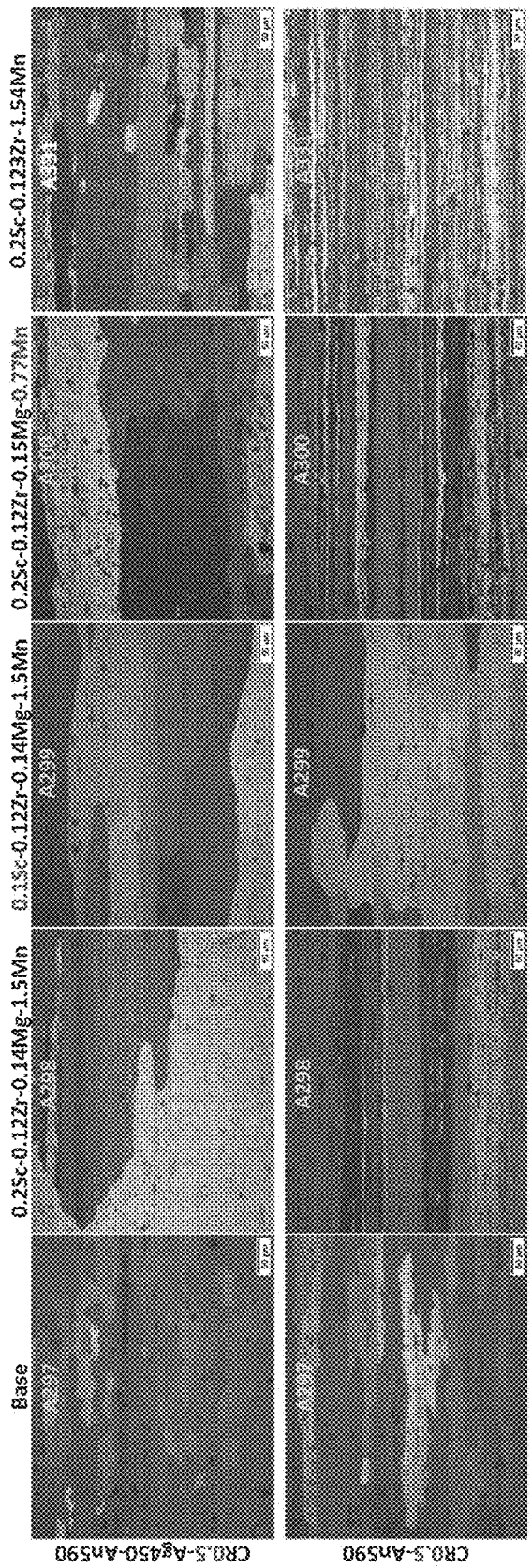
FIG. 8 is a series of optical micrographs of microstructures for various alloys, as revealed by the application of Barker's Etch. The matrix of images is cross-labeled by alloy composition from the top row and the processing condition (in this case, cold-rolling at 0.5 mm) from the left column. The alloys denoted "Ag450" were ramped at 50° C./hr to 450° C., aged for 4 hours, and cooled at 50° C./hr to about 100° C. The alloys denoted "An590" were annealed at 590° C. for 0.5 hr.

FIG. 8 is a series of optical micrographs of microstructures for various alloys, as revealed by the application of Barker's Etch. The matrix of images is cross-labeled by alloy composition from the top row and the processing condition (in this case, cold-rolling at 0.5 mm) from the left column. The alloys denoted "Ag450" were ramped at 50° C./hr to 450° C., aged for 4 hours, and cooled at 50° C./hr to about 100° C. The alloys denoted "An590" were annealed at 590° C. for 0.5 hr.

Figure 9:
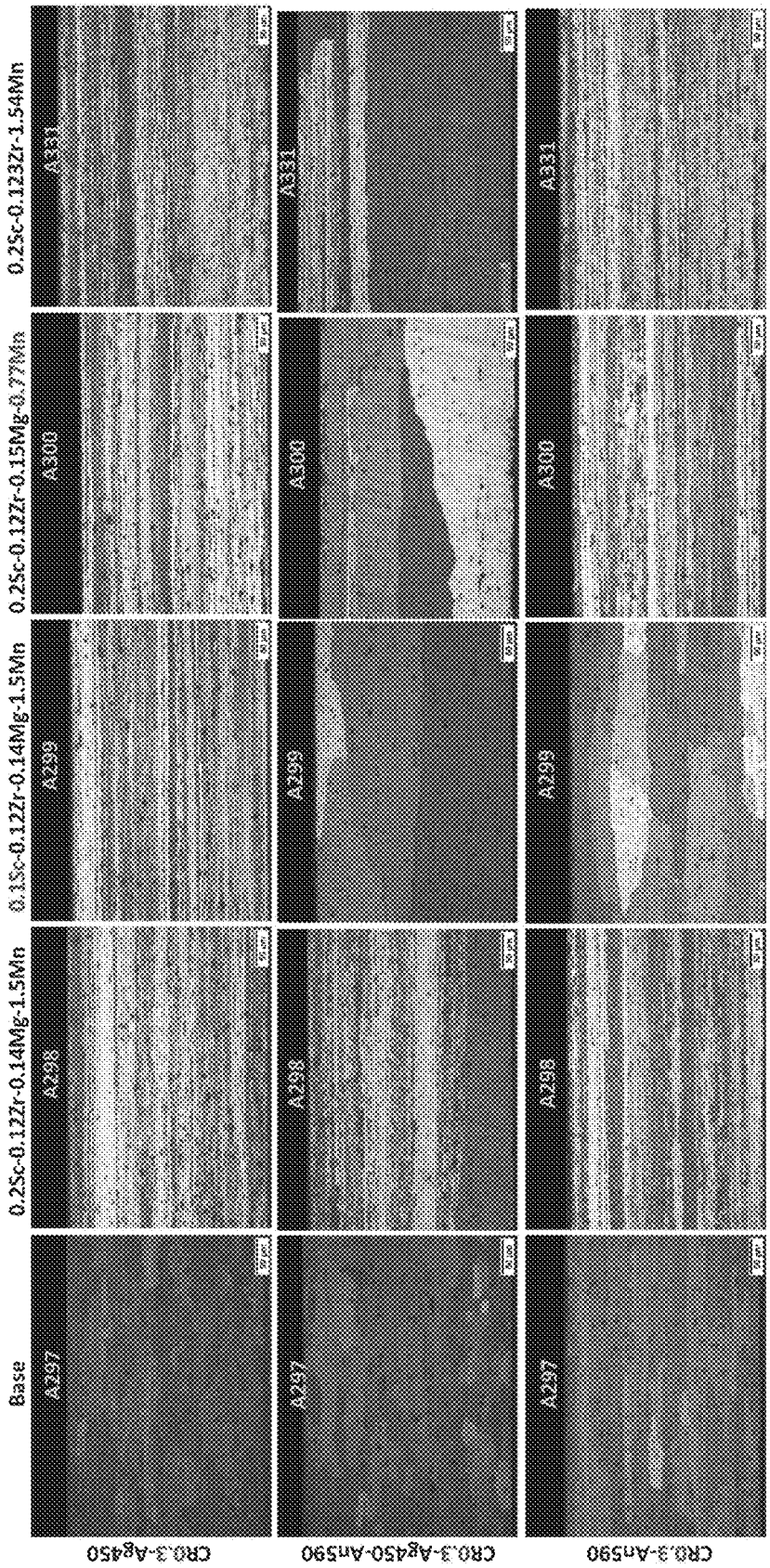
FIG. 9 is a series of optical micrographs of microstructures for various alloys, as revealed by the application of Barker's Etch. The matrix of images is cross-labeled by alloy composition from the top row and the processing condition (in this case, cold-rolling at 0.3 mm) from the left column. The alloys denoted "Ag450" were ramped at 50° C./hr to 450° C., aged for 4 hours, and cooled at 50° C./hr to about 100° C. The alloys denoted "An590" were annealed at 590° C. for 0.5 hr.

FIG. 9 is a series of optical micrographs of microstructures for various alloys, as revealed by the application of Barker's Etch. The matrix of images is cross-labeled by alloy composition from the top row and the processing condition (in this case, cold-rolling at 0.3 mm) from the left column. The alloys denoted "Ag450" were ramped at 50° C./hr to 450° C., aged for 4 hours, and cooled at 50° C./hr to about 100° C. The alloys denoted "An590" were annealed at 590° C. for 0.5 hr.

Figure 10:
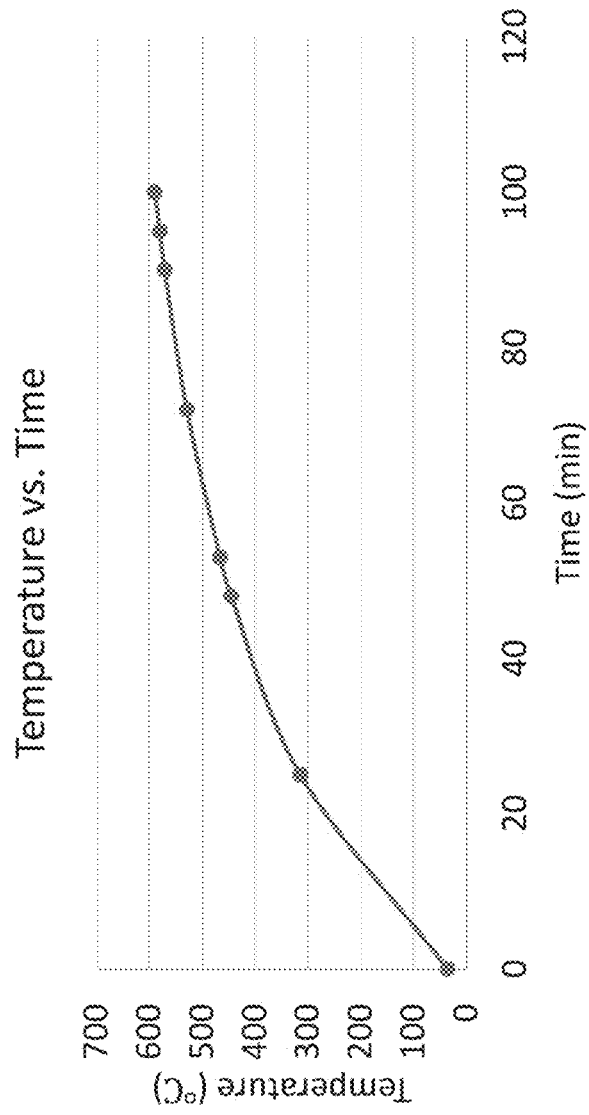
FIG. 10 is a temperature cycle (that is, temperature (in ° C.) as a function of time) for the heat treatment cycle referred to herein as "Braze 1—air furnace", which is intended to mimic common brazing temperatures that aluminum alloys are exposed to. In this temperature cycle, the temperature of the samples was ramped to 590° C. in 100 minutes, held there for 5 minutes, and cooled in air.
Figure 11:
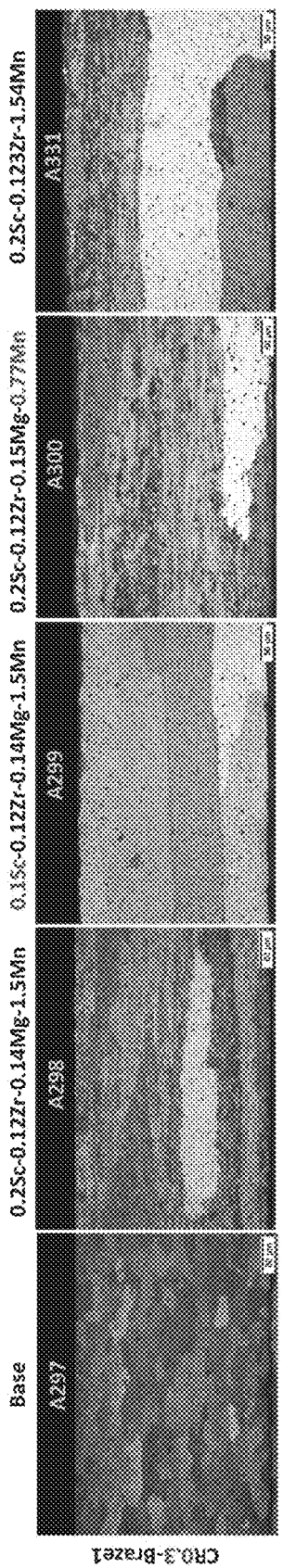

FIG. 11 is a series of optical micrographs of microstructures for various alloys, as revealed by the application of Barker's Etch. The alloys were subjected to the temperature cycle depicted in FIG. 10.

Figure 12:
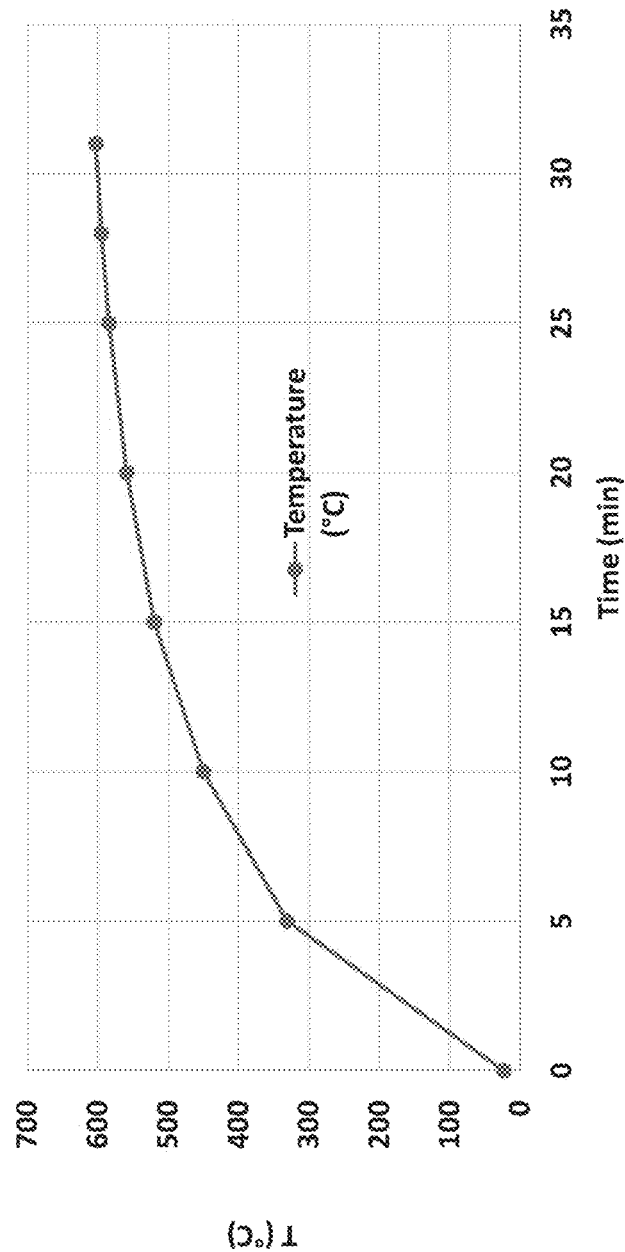
FIG. 12 is a temperature cycle (that is, temperature (in ° C.) as a function of time) for the heat treatment cycle referred to herein as "Braze 2—air furnace", which is intended to mimic common brazing temperatures that aluminum alloys are exposed to. In this temperature cycle, the temperature of the samples was ramped to 590° C. in 30 minutes, held there for 5 minutes, and cooled in air.
Figure 13:
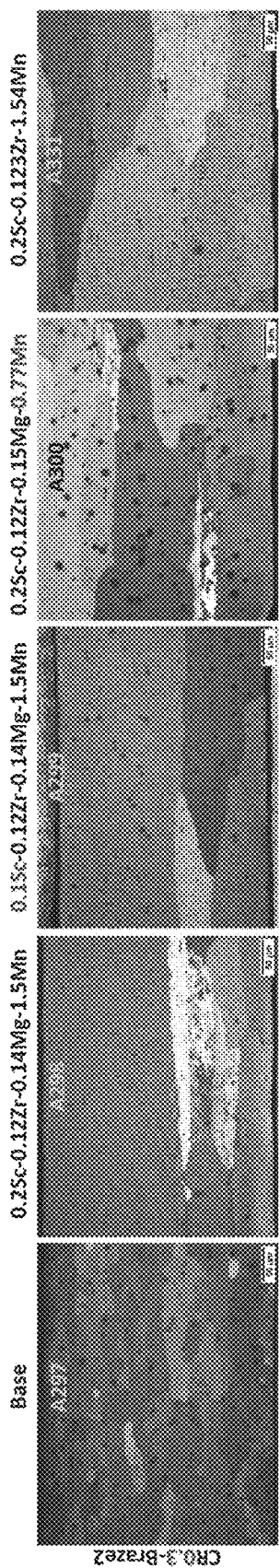
FIG. 13 is a series of optical micrographs of microstructures for various alloys, as revealed by the application of Barker's Etch. The alloys were subjected to the temperature cycle depicted in FIG. 12.

FIG. 13 is a series of optical micrographs of microstructures for various alloys, as revealed by the application of Barker's Etch. The alloys were subjected to the temperature cycle depicted in FIG. 12.

FIG. 14 is a table of tensile test results for a series of alloys which were subjected to 0.3 mm cold rolling (from 10 mm) followed by heat treatment.

FIG. 15 is a table demonstrating the effect of processing on recrystallization. The alloy samples denoted "Ag450" were subjected to a heat treatment in which temperature was ramped at 50° C./hr to 450° C., followed by aging for 4 hours, followed by cooling at 50° C./hr to about 100° C. The alloy samples denoted "An590" were annealed at 590° C. for 0.5 hours.

Figure 16:
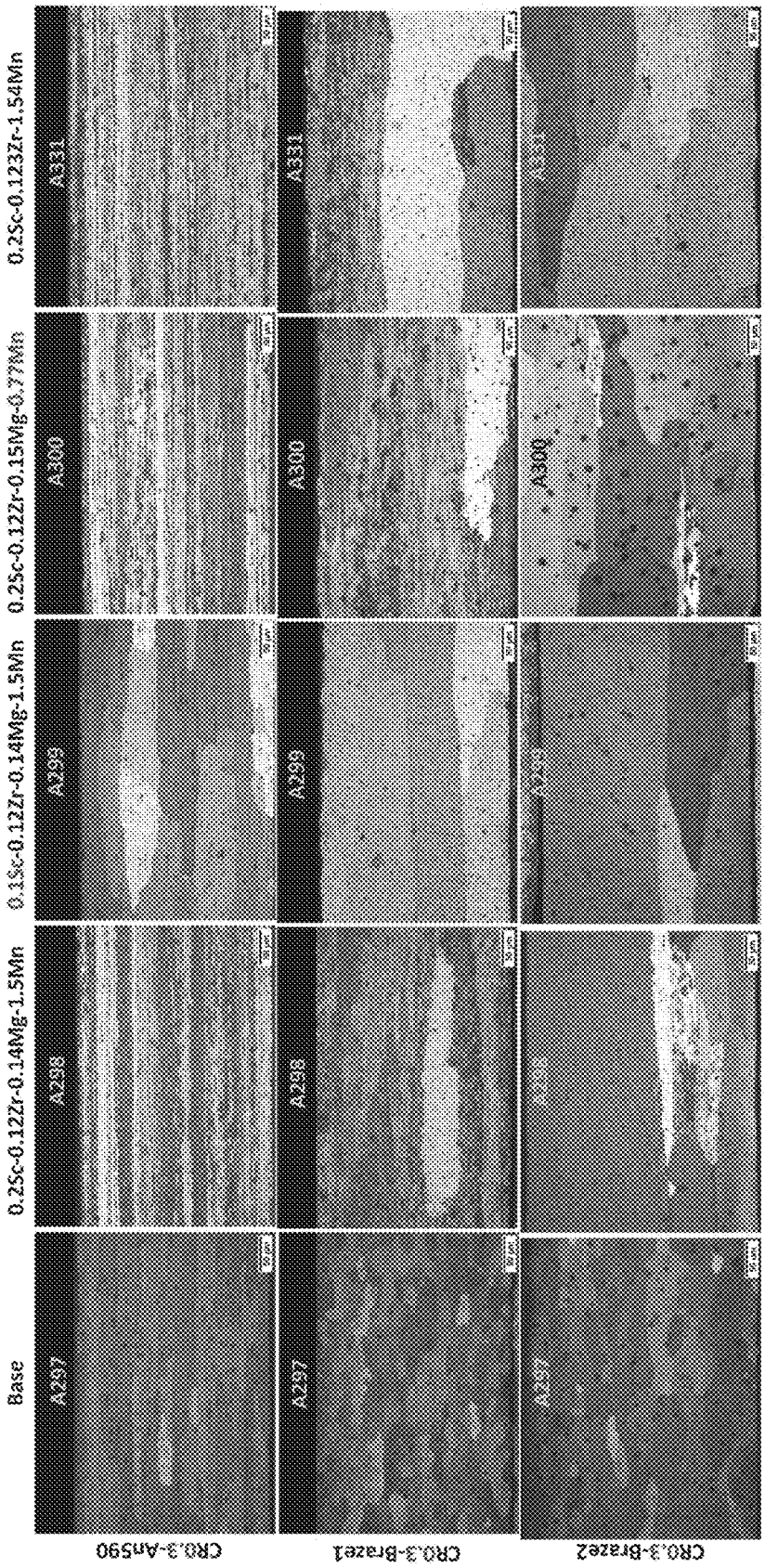
FIG. 16 is a series of optical micrographs of microstructures for various alloys, as revealed by the application of Barker's Etch. The micrographs were taken from alloys which were cold-rolled from 10 mm to 0.3 mm. The alloys were subjected to the temperature cycle depicted in FIG. 10.

FIG. 16 is a series of optical micrographs of microstructures for various alloys, as revealed by the application of Barker's Etch. The micrographs were taken from alloys which were cold-rolled from 10 mm to 0.3 mm. The alloys were subjected to the temperature cycle depicted in FIG. 10.

Figure 17:
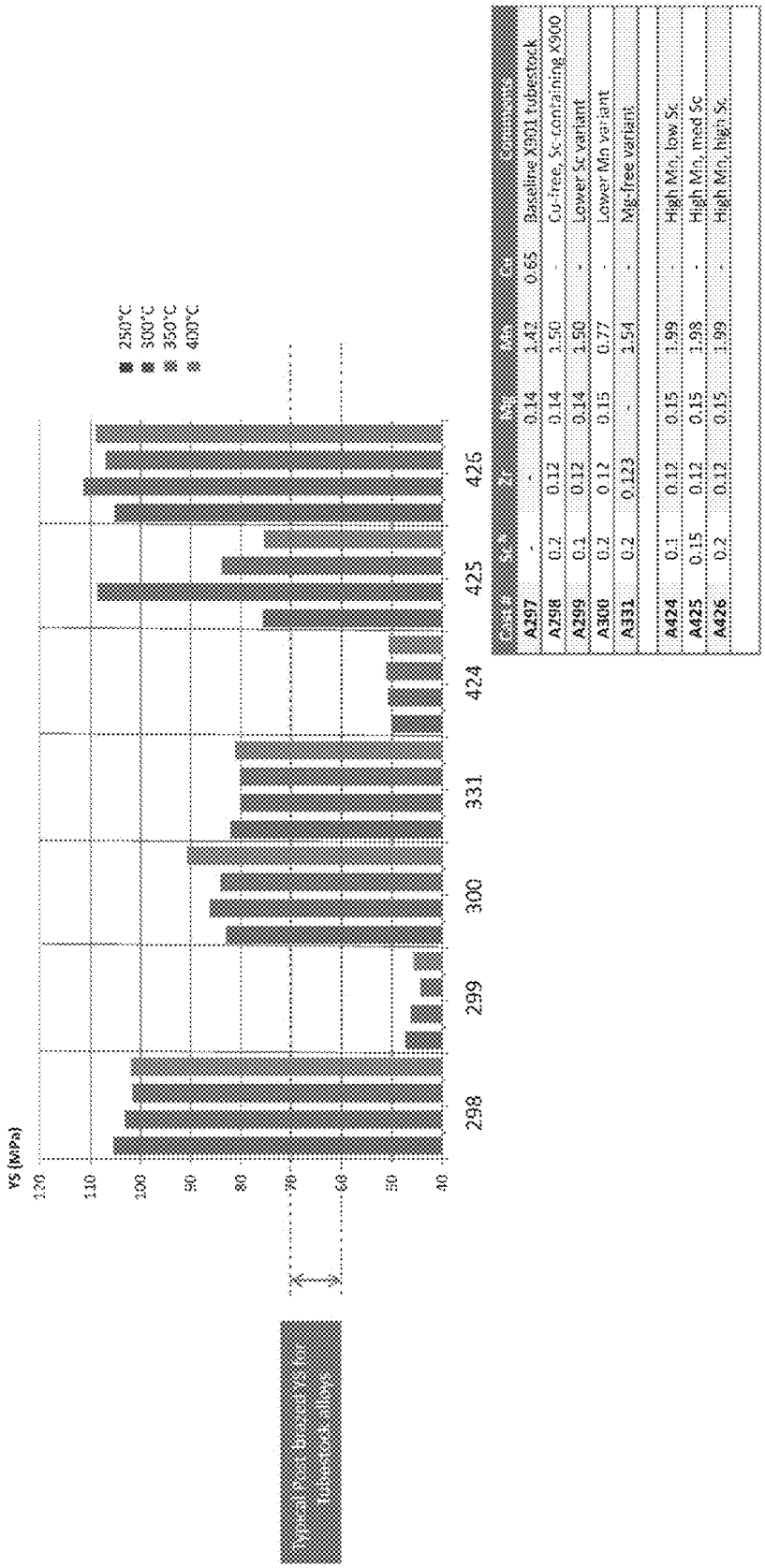
FIG. 17 is a chart depicting the effect of pre-aging temperature (in terms of yield strength) on post-brazed tensile properties for a series of cast alloys that were cold-rolled from 10 mm to 0.3 mm. For comparison, the range of typical post-brazed yield strengths is also noted.

FIG. 17 is a chart depicting the effect of pre-aging temperature (in terms of yield strength) on post-brazed tensile properties for a series of cast alloys that were cold-rolled from 10 mm to 0.3 mm. For comparison, the range of typical post-brazed yield strengths is also noted.

Figure 18:
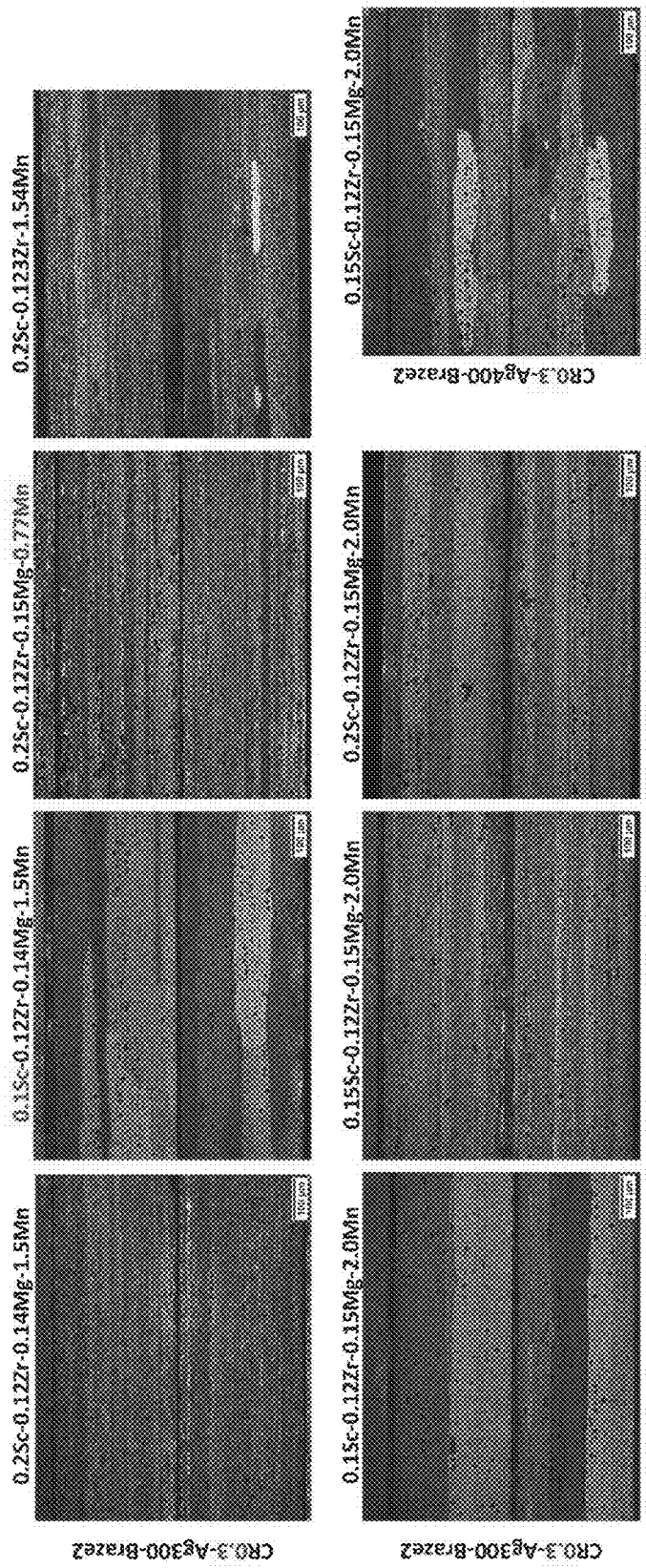
FIG. 18 is a series of optical micrographs of post-brazed microstructures for various alloys, as revealed by the application of Barker's Etch. The micrographs were taken from alloys which were cold-rolled from 10 mm to 0.3 mm. The alloys were subjected to the temperature cycle depicted in FIG. 12.

FIG. 18 is a series of optical micrographs of post-brazed microstructures for various alloys, as revealed by the application of Barker's Etch. The micrographs were taken from alloys which were cold-rolled from 10 mm to 0.3 mm. The alloys were subjected to the temperature cycle depicted in FIG. 12.

Several trends may be discerned from the foregoing examples. First of all, these examples demonstrate that recrystallisation may be prevented during a braze simulation by the addition of 0.2 wt % Sc and 0.12 wt % Zr to Al—Mn-Mg alloys. Secondly, the effect of pre-ageing prior to brazing was found to have a positive effect on increasing the tendency of the alloy to impede recrystallisation. Thirdly, post-brazed yield strength values in excess of 100 MPa were attained for two of the AlMnMgScZr alloys after a pre-ageing treatment. For these variants, there was no effect of the pre-ageing temperature over the range studied (250-400° C.). Interestingly, the alloy containing 0.15 wt % Sc, when pre-aged at 400° C. before brazing, showed a post-brazed yield strength (YS) or tensile value of that approached 110 MPa. Moreover, post-brazed grain structures were consistent with the YS values, that is:

low YS (~50 MPa)→fully recrystallised grain structure
high YS (100 Mpa)→unrecrystallised grain structure
mid YS (~80 Mpa)→partially recrystallised grain structure Various modifications may be made to the systems and methodologies disclosed herein without departing from the scope of the systems and methodologies described herein. For example, the specific examples disclosed herein feature heat treatment for 4-hour hold times. However, one skilled in the art will appreciate that various studies may be undertaken to determine the optimal amount of time for heat treatment. Doing so may be beneficial for optimizing properties and to help understand the mechanism(s) involved in impeding recrystallisation.

Moreover, various casting methodologies may be utilized in the preparation of aluminum alloys in accordance with the teachings herein. For example, belt casting may be utilized for this purpose. Doing so may reduce the Sc content, without having a significant adverse impact on the properties of the alloys. Examples of suitable belt casting include, for example, the methodologies disclosed in U.S. Pat. No. 9,695,495 (Zhao et al.), which is incorporated herein by reference in its entirety.

In addition, although many of the recrystallization experiments described herein feature materials at a typical tube stock at gauge (0.3 mm), Sc-containing compositions may be utilized to impede recrystallisation at other gauges (such as, for example, at fin stock gauges of 0.05 to 0.1 mm). In such applications, the effects (if any) of increased strain on recrystallisation may be ascertained and taken into account.

In some embodiments of the systems and methodologies disclosed herein, a portion of the scandium content of the alloy may be replaced by at least one element selected from the group consisting of Zr and rare earth elements. The use of Zr, Er, Y and Ce for this purpose is especially preferred, although the use of one or more of Dy, Eu, Gd, Ho, La, Lu, Nd, Pr, Sm, Tb, Tm and Yb may also be beneficial in some applications. Without wishing to be bound by theory, it is believed that the presence of suitable amounts of one or more of these elements may afford better control over the size of the $Al_3Sc$ inter-metallic crystals which, in turn, are believed to control (reduce) re-crystallization and give rise to higher tensile strengths. The molar ratio of these elements to scandium may vary depending on the application and the mechanical properties desired in the resulting alloy. However, in the case of Zr, the molar ratio of Zr:Sc in the alloy is preferably in the range of about 0.5 to about 1.5, more preferably in the range of about 0.75 to about 1.25, even more preferably in the range of 0.9 to 1.1, and most preferably about 1.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, absent an explicit teaching otherwise, any limitation in any dependent claim may be combined with any limitation in any other dependent claim without departing from the scope of the invention, even if such a combination is not explicitly set forth in any of the following claims.

What is claimed is:

1. A method for fabricating an article from an aluminum alloy, comprising:
   providing an aluminum alloy containing
   (a) at least 0.04 wt % Sc,
   (b) at least 0.5 wt % Mn,
   (c) at least 0.05 wt % Zr,
   (d) at least 0.05 wt % Mg, and
   (e) at least 90 wt % Al;
   casting the alloy into a sheet;
   subjecting the cast alloy to a thermal cycle which includes
   raising the temperature of the alloy along a first temperature gradient, holding the temperature of the alloy at a temperature T for a period of time t, and reducing the temperature of the alloy along a second temperature gradient; and utilizing the sheet in a brazing operation.

2. The method of claim 1, wherein T is at least 400° C.

3. The method of claim 1, wherein T is at least 450° C.

4. The method of claim 1, wherein T is within the range of 300° C. to 400° C.

5. The method of claim 1, wherein t is 2 hours.

6. The method of claim 1, wherein t is 4 hours.

7. The method of claim 1, wherein utilizing the sheet in a brazing operation exposes the sheet to temperatures of at least $T_b$ for a time period of at least $t_b$.

8. The method of claim 7, wherein $T_b$ is 550° C.

9. The method of claim 1, wherein tb is 30 minutes.

10. The method of claim 1, wherein utilizing the sheet in a brazing operation includes:

folding the sheet into a configuration in which a first portion of the sheet is adjacent to a second portion of the sheet; and forming a solder joint between the first and second portions of the sheet.

11. The method of claim 1, wherein utilizing the sheet in a brazing operation includes:

folding the sheet into a configuration in which a first portion of the sheet is adjacent to a second portion of the sheet;

wicking a solder composition between the first and second portions of the sheet; and allowing the solder composition to harden.

12. The method of claim 1, wherein utilizing the sheet in a brazing operation includes:

coating the sheet with a solder composition;

forming the coated sheet into an article in which the solder composition is proximal to, but not attached to, an adjacent portion of the alloy; and subjecting the article to a brazing process such that the solder composition undergoes melting and re-solidification, and thereby forms a solder joint to the adjacent portion of the alloy, thus resulting in a brazed article.

13. The method of claim 1, further comprising:

reducing the thickness of the cast sheet prior to subjecting the cast alloy to a thermal cycle.

14. The method of claim 13, wherein reducing the thickness of the cast sheet includes subjecting the cast sheet to cold rolling.

15. The method of claim 14, wherein the thickness of the cast sheet is reduced to no more than about 25% of its original thickness.

16. The method of claim 1, wherein the alloy contains at least 0.04% Sc.

17. The method of claim 1, wherein the alloy contains at least 0.2 wt % Sc.

18. The method of claim 1, wherein the alloy contains at least 1.5 wt % Mn.

19. The method of claim 1, wherein the alloy contains at least 0.1 wt % Zr.

20. The method of claim 1, wherein the alloy contains at least 0.1 wt % Mg.

* * * * *